(12) United States Patent
Levi

(10) Patent No.: US 6,623,368 B1
(45) Date of Patent: Sep. 23, 2003

(54) SWINGING SEAT WITH SPRING SUSPENSION

(75) Inventor: Michael Levi, Fletcher, NC (US)

(73) Assignee: Levi Tool and Mold Corporation, Fletcher, NC (US)

( * ) Notice: Subject to any disclaimer, the term of this patent is extended or adjusted under 35 U.S.C. 154(b) by 0 days.

(21) Appl. No.: 09/569,539

(22) Filed: May 12, 2000

(51) Int. Cl.7 .................................................. A63G 9/14
(52) U.S. Cl. ...................................... 472/118; 472/125
(58) Field of Search ............................... 472/118, 120, 472/121, 122, 123, 124, 125, 103, 104, 105; 267/73, 74, 166, 166.1, 155, 167, 180

(56) References Cited

U.S. PATENT DOCUMENTS

| | | | |
|---|---|---|---|
| 1,390,502 A | | 9/1921 | Clouser |
| 2,254,566 A | * | 9/1941 | Cornell, Jr. ................. 267/166 |
| 2,622,448 A | * | 12/1952 | Lorig .......................... 267/166 |
| 3,132,860 A | * | 5/1964 | Nantz .......................... 472/105 |
| 3,186,711 A | | 6/1965 | Morrow |
| 3,256,016 A | | 6/1966 | Berlin |
| 3,580,571 A | | 5/1971 | Green |
| 4,138,104 A | | 2/1979 | D'Amicis |
| 4,836,534 A | | 6/1989 | Lewis |
| 5,004,216 A | * | 4/1991 | Boudreau ................. 267/166.1 |
| 5,342,245 A | | 8/1994 | Webb, Jr. |
| 5,507,476 A | * | 4/1996 | Lin ............................. 267/132 |
| 5,511,258 A | | 4/1996 | Barr, Sr. |
| 5,564,987 A | | 10/1996 | Ayrolles |
| 5,984,792 A | | 11/1999 | Clark |

* cited by examiner

Primary Examiner—Kien T. Nguyen
(74) Attorney, Agent, or Firm—Alston & Bird LLP

(57) ABSTRACT

A swinging seat includes suspension members having coil springs of nonlinear response so that the seat has a desirable bouncy feel for a wide range of weights supported on the seat. The springs in one embodiment are barrel shaped having coils of maximum diameter at the middle and coils of minimum diameter at the opposite ends of the spring.

6 Claims, 2 Drawing Sheets

SWINGING SEAT WITH SPRING SUSPENSION

FIELD OF THE INVENTION

The invention relates to swinging seats such as porch swings or the like.

BACKGROUND OF THE INVENTION

Porch swings are a fixture of leisurely living. Many people find the slow, gentle swinging action of a porch swing to be very soothing. As a general rule, porch swings that are commercially available are furnished with a pair of ordinary chains for suspending the swing from the porch ceiling. The chains are inextensible and hence do not provide any bounce or springiness to the suspension of the swing.

It is also known to include coil tension springs in the suspension of swinging seats to provide such springiness. Representative examples of such seats are shown in U.S. Pat. Nos. 1,390,502, 3,256,016, 4,138,104, 5,564,987, and 5,984,792.

SUMMARY OF THE INVENTION

The present invention seeks to improve upon the types of swinging seats disclosed in the aforementioned patents. In accordance with the present invention, a porch swing or the like is suspended from a pair of suspension members each of which includes a coil spring having two or more different zones providing two or more different initial spring constants. A first zone of the spring provides a relatively low initial spring constant so that the springs are sufficiently stretched to provide the desired amount of bounce or springiness to the seat when a person of relatively low weight such as a child is sitting on the seat. The second zone provides a relatively high initial spring constant so that when a heavier person, or more than one person, sits on the seat the total elongation of the spring is significantly less than it would be if the entire spring had the spring constant of the first zone. Accordingly, the springs provide a desired amount of stretch and springiness for a much wider range of weights supported on the seat than a conventional spring having a single spring constant. In other words, the springs have a nonlinear spring constant, rather than a linear spring constant as a typical coil spring has.

Preferably, the springs are barrel shaped having a maximum coil diameter at the middles of the springs and tapering to minimum coil diameters at the two ends of the springs. The largest coils at the middle of the spring provide a relatively low initial spring constant (i.e., the spring constant that applies when the coils are stretched apart starting from an unstretched condition). The smallest coils at the ends of the spring provide a relatively high initial spring constant, and thus will not begin to stretch to any significant extent until the largest coils have already undergone a large degree of stretching.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
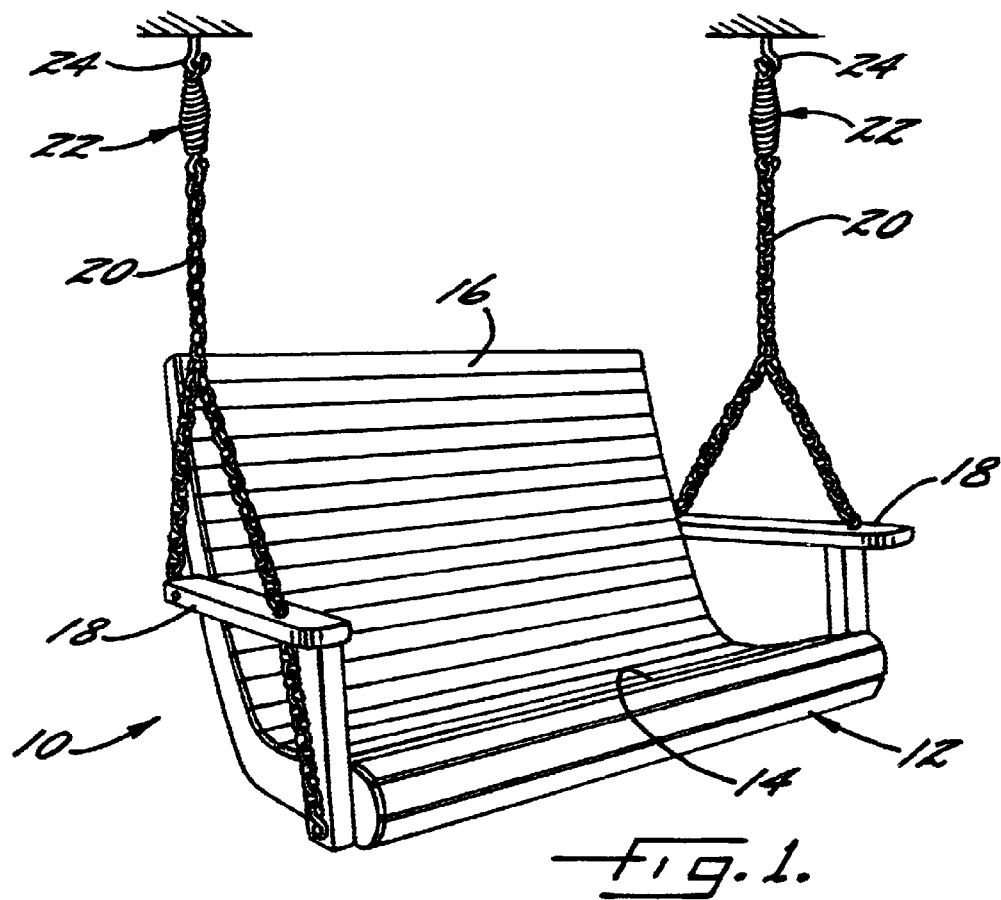
FIG. 1 is a perspective view of a porch swing in accordance with an embodiment of the invention.

FIG. 1 shows a porch swing 10 in accordance with an embodiment of the present invention. The swing 10 includes a seat 12 having a bottom 14, a back 16, and two arm rests 18. A suspension chain 20 is attached to each of the opposite ends of the seat 12. At some point in each suspension chain 20, preferably at the top end of the chain, a coil spring 22 is disposed. In the illustrated embodiment, the coil springs 22 have their lower ends attached to the top ends of the chains; the upper ends of the springs 22 are attached to suitable fittings 24 fixed to a ceiling or other structure.

Figure 2:
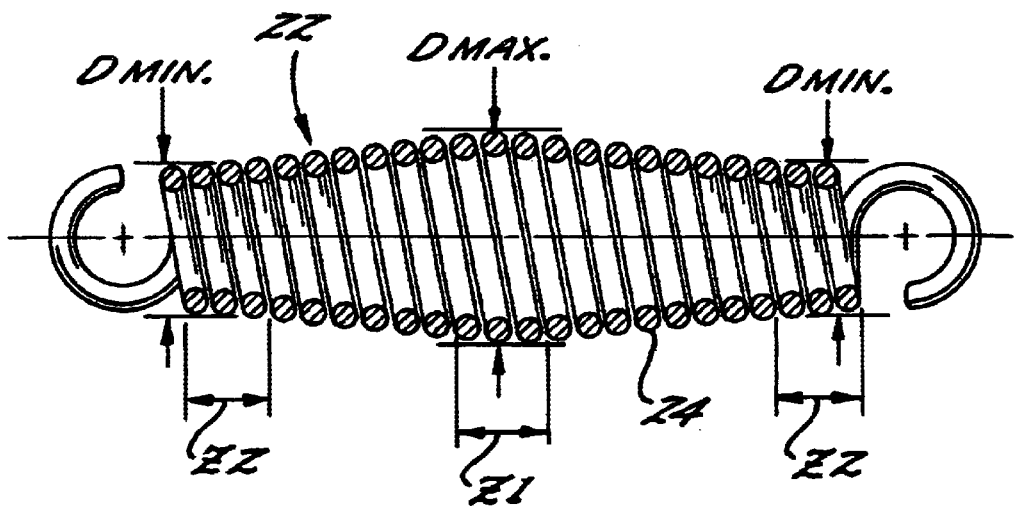
FIG. 2 is a sectioned side elevation of a spring in accordance with one embodiment of the invention.

FIG. 2 depicts one embodiment of a spring 22 in accordance with the invention. The spring 22 provides a nonlinear force-displacement characteristic so that the swing will have a desirable bouncy feel for a wide range of weights supported on the seat. To this end, the spring 22 is formed from a wire 24, preferably of constant wire diameter, that is wound about an axis so as to form coils of different diameters in different zones of the spring. A middle zone $Z_1$ of the spring has coils of a maximum diameter $D_{max}$. Opposite end zones $Z_2$ have coils of a minimum diameter $D_{min}$. Advantageously, the coil diameter gradually decreases from the middle zone to the end zones. In a preferred embodiment, the coil diameter decreases by about half the wire diameter from each coil to the next adjacent coil.

Figure 3:
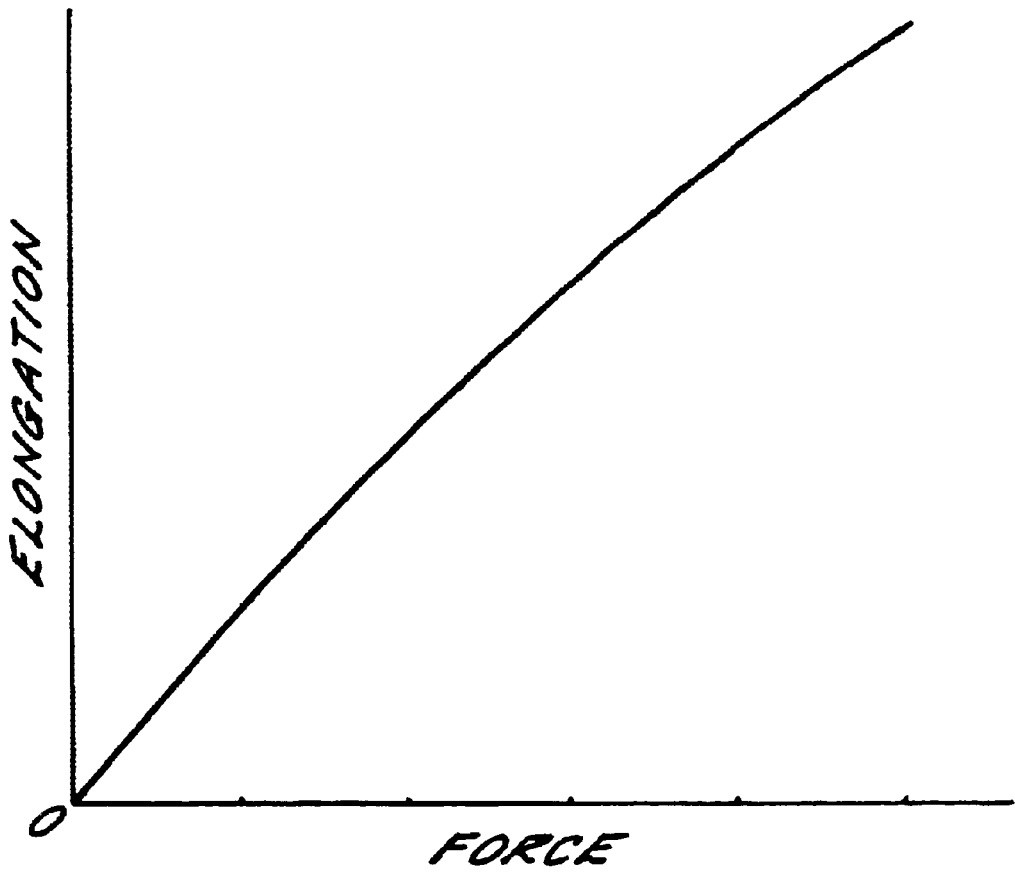
FIG. 3 is a graph illustrating the nonlinear response characteristic of the spring of FIG. 2.

The middle zone $Z_1$ has a relatively low initial spring constant. The end zones $Z_2$ have a relatively high initial spring constant. The coils between the middle zone and the end zones have spring constants intermediate between those of the middle and end zones. The result is a spring having a nonlinear spring rate. FIG. 3 depicts in diagrammatic form the type of nonlinear spring rate provided by the spring.

In a preferred embodiment of the invention, the spring 22 is formed of 0.218 inch diameter music wire wound to form about 26 coils having a maximum coil diameter of about 1.8 inches at the middle and minimum coil diameters at the two ends of about 1.25 inches, and a length of about 6 inches. The coil diameter decreases by about half the wire diameter from each coil to the next adjacent coil. The following table provides representative force-displacement data for a spring having such a configuration:

| Force (pounds) | Total Elongation (in) |
|---|---|
| 25 | 0.545 |
| 50 | 1.035 |
| 75 | 1.455 |

-continued

| Force (pounds) | Total Elongation (in) |
|---|---|
| 100 | 1.830 |
| 125 | 2.180 |

The elongation of 0.545 inches at 25 pounds load is indicative of the spring rate of the largest coils at the middle of the spring. If the entire spring were made up of coils of this diameter, it would be expected that the elongation of the spring at 125 pounds load would be about five times that at 25 pounds load, or about 2.73 inches. It will be noted, however, that the spring elongation at 125 pounds load is actually only about 2.18 inches because of the higher spring constant provided by the smaller coils at the ends of the spring.

The invention thus provides a unique swinging seat having a desirable bouncy feel for a wide range of weights so that persons of widely differing sizes and ages from children to adults can enjoy the soothing support that the seat provides.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A swinging seat with resilient suspension, comprising:
    a seat having at least a bottom for supporting one or more persons sitting thereon; and
    a pair of suspension members having lower ends attached to opposite ends of the seat and upper ends adapted to be attached to a ceiling structure for suspending the seat therefrom, each suspension member including a coil spring imparting resilience to the suspension member;
    wherein each coil spring has a plurality of coils defining at least first and second zones of differing initial spring constant, the first zone being formed by coils providing a first initial spring constant when said coils are initially stretched, the second zone being formed by coils providing a second initial spring constant substantially greater than the first initial spring constant when said coils are initially stretched, whereby the two zones provide a desired level of resilience for a wide range of weights supported on the seat.

2. The seat of claim 1, wherein the coils in said first and second zones are wound helically about an axis of the spring and the coils in said first zone are wound at a diameter from the axis that is substantially greater than that at which the coils in said second zone are wound.

3. The seat of claim 2, wherein each spring is barrel shaped with coils of a maximum diameter located proximate a lengthwise midpoint of the spring, the diameters of the coils decreasing gradually toward the opposite ends of the spring.

4. The seat of claim 3, wherein the springs are formed from a wire having a constant diameter, and the coil diameters decrease toward the opposite ends of the spring by about half of the wire diameter from each coil to the next adjacent coil.

5. The seat of claim 4, wherein the wire comprises a music wire.

6. The seat of claim 5, wherein each spring has a length of about 6–8 inches, a maximum coil diameter of about one and three-quarters inches at the lengthwise midpoint of the spring and minimum coil diameters of about one and one-quarter inches at the opposite ends of the spring.

* * * * *